US 7,706,465 B2

United States Patent
Gorday et al.

(10) Patent No.: US 7,706,465 B2
(45) Date of Patent: Apr. 27, 2010

(54) METHOD AND APPARATUS FOR COMMUNICATION BY A SECONDARY USER OF SPECTRUM

(75) Inventors: Paul E. Gorday, West Palm Beach, FL (US); Edgar H. Callaway, Jr., Boca Raton, FL (US); David B. Taubenheim, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 734 days.

(21) Appl. No.: 11/566,893

(22) Filed: Dec. 5, 2006

(65) Prior Publication Data

US 2008/0130715 A1 Jun. 5, 2008

(51) Int. Cl.
*H04L 27/00* (2006.01)
(52) U.S. Cl. ...................... 375/295; 375/260
(58) Field of Classification Search ............... 375/260, 375/267, 295, 299; 370/208–209
See application file for complete search history.

(56) References Cited

U.S. PATENT DOCUMENTS

| | | | |
|---|---|---|---|
| 2002/0002052 A1 | 1/2002 | McHenry | |
| 2004/0142696 A1 | 7/2004 | Saunders et al. | |
| 2004/0233888 A1 | 11/2004 | Bonta et al. | |
| 2004/0264507 A1* | 12/2004 | Cho et al. | 370/480 |
| 2005/0053280 A1* | 3/2005 | Nishikawa | 382/167 |
| 2005/0163265 A1* | 7/2005 | Gupta | 375/343 |
| 2007/0110174 A1* | 5/2007 | Glazko et al. | 375/260 |
| 2007/0201572 A1* | 8/2007 | Krauss et al. | 375/260 |
| 2009/0161774 A1* | 6/2009 | Liu et al. | 375/260 |
| 2009/0190675 A1* | 7/2009 | Ling et al. | 375/260 |

OTHER PUBLICATIONS

R. Prasad and S. Hara, "An Overview of Multi-Carrier CDMA", IEEE Communications Magazine, vol. 35, pp. 107-114, 1996.
H. Tang, "Some Physical Layer Issues of Wideband Cognitive Radio Systems", First IEEE International Symposium on New Frontiers in Dynamic Spectrum Access Networks, pp. 151-155, Nov. 2005.
Lee W. Young, "PCT/US2007/081590—PCT International Search Report and Written Opinion," WIPO, ISA/US, Commissioner for Patents, Alexandria, VA, USA, May 1, 2008.
Philippe Becamel, "PCT/US2007/081590—PCT International Preliminary Report on Patentability," The International Bureau of WIPO, Geneva, Switzerland, Jun. 18, 2009.

* cited by examiner

*Primary Examiner*—Emmanuel Bayard

(57) ABSTRACT

During operation of a node in a secondary communication system (100) data enters a spreader (301) and is appropriately spread. The spread data is then modulated onto all available channels using a multi-carrier OFDM modulation technique. This entails the spread data being modulated onto those channels that are currently being used by the primary communication system (120). Finally, a transmitter (303) transmits the spread data only over carriers that will not interfere with the primary communication system.

15 Claims, 4 Drawing Sheets

101 mary communication system. Finally, a transmitter transmits the spread data only over carriers that will not interfere with the primary communication system.
METHOD AND APPARATUS FOR COMMUNICATION BY A SECONDARY USER OF SPECTRUM

FIELD OF THE INVENTION

The present invention relates generally to wireless communications, and in particular, to a method and apparatus for communication by a secondary user of spectrum.

BACKGROUND OF THE INVENTION

In a cognitive radio system, a cognitive secondary radio will utilize spectrum assigned to a primary system using an opportunistic approach. With this approach, the secondary radio system will share the spectrum with primary incumbents as well as those operating under authorization on a secondary basis. Under these conditions, it is imperative that any user in the cognitive radio system not interfere with primary users. Some types of cognitive radio systems (e.g., IEEE 802.22) require that devices sense the channel to detect a licensed, primary user. The devices are allowed to transmit if their transmissions will not interfere with any primary user. This is generally accomplished by the secondary user determining a signal strength of the primary users on a particular channel, and if the signal of any primary user is above a predetermined threshold, the cognitive radio device determines that its transmissions on that channel would cause interference to the primary user, and so inhibits transmission.

Many cognitive radio proposals are based on a multi-carrier (e.g. Orthogonal Frequency Division Multiplexed OFDM)) physical layer due to their inherent frequency shaping ability. Data can be transmitted on most of the carriers while others are left blank to reduce interference to specific frequency bands. To maximize throughput and avoid data loss, the receiver should have a priori knowledge of the carrier formatting.

A problem exists in that sometimes the receiver may not know the carrier formatting (i.e., what carriers are being utilized for transmission) prior to frame reception. For example, if a calling channel is used to initiate communication between two devices, the transmitting device will first perform spectrum measurements to determine which carriers need to be empty and which can carry data. In the absence of other handshaking messages, the transmitting device has no way to let the receiver know the resulting carrier format prior to the calling channel request. What is needed is a method and apparatus for communication by a secondary user of spectrum by which the receiver can demodulate transmissions without a priori knowledge of carrier format.

DETAILED DESCRIPTION OF THE DRAWINGS

To address the above-mentioned need a method and apparatus is provided for allowing communication of a secondary communication device over spectrum allocated to a primary user. During operation of a node in a secondary communication system data enters a spreader and is appropriately spread. The spread data is then modulated onto all available channels using a multi-carrier spread-OFDM modulation technique. This entails the spread data being modulated onto those channels that are currently being used by the primary communication system. Finally, a transmitter transmits the spread data only over carriers that will not interfere with the primary communication system.

Because not all carriers will be transmitted by the secondary transmitter, secondary receivers will only receive a portion of the available data. However, because spread-OFDM is being utilized, the system is robust to lost carriers. Thus, the processing gain of spread-OFDM allows a plurality of subcarriers to be lost without loss of the transmitted data. The two devices may then negotiate radio parameters (modulation, channels, format, etc.) for data transmission.

The present invention encompasses a method for transmitting data. The method comprises the steps of receiving data to be transmitted, spreading the data, and modulating the data onto a plurality of available channels. The spread data is transmitted over a number of channels that is less than the plurality of available channels.

The present invention additionally encompasses a method comprising the steps of receiving data for initiating communications between two nodes in a secondary communication system and spreading the data over a first number of channels. A second number of channels is determined that will not interfere with a primary communication system and the spread data is transmitted over the second number of channels.

The present invention additionally encompasses an apparatus comprising a spreader receiving data and spreading the data over a plurality of available channels, and a transmitter transmitting the spread data over a number of channels that is less than the plurality of available channels.

Figure 1:
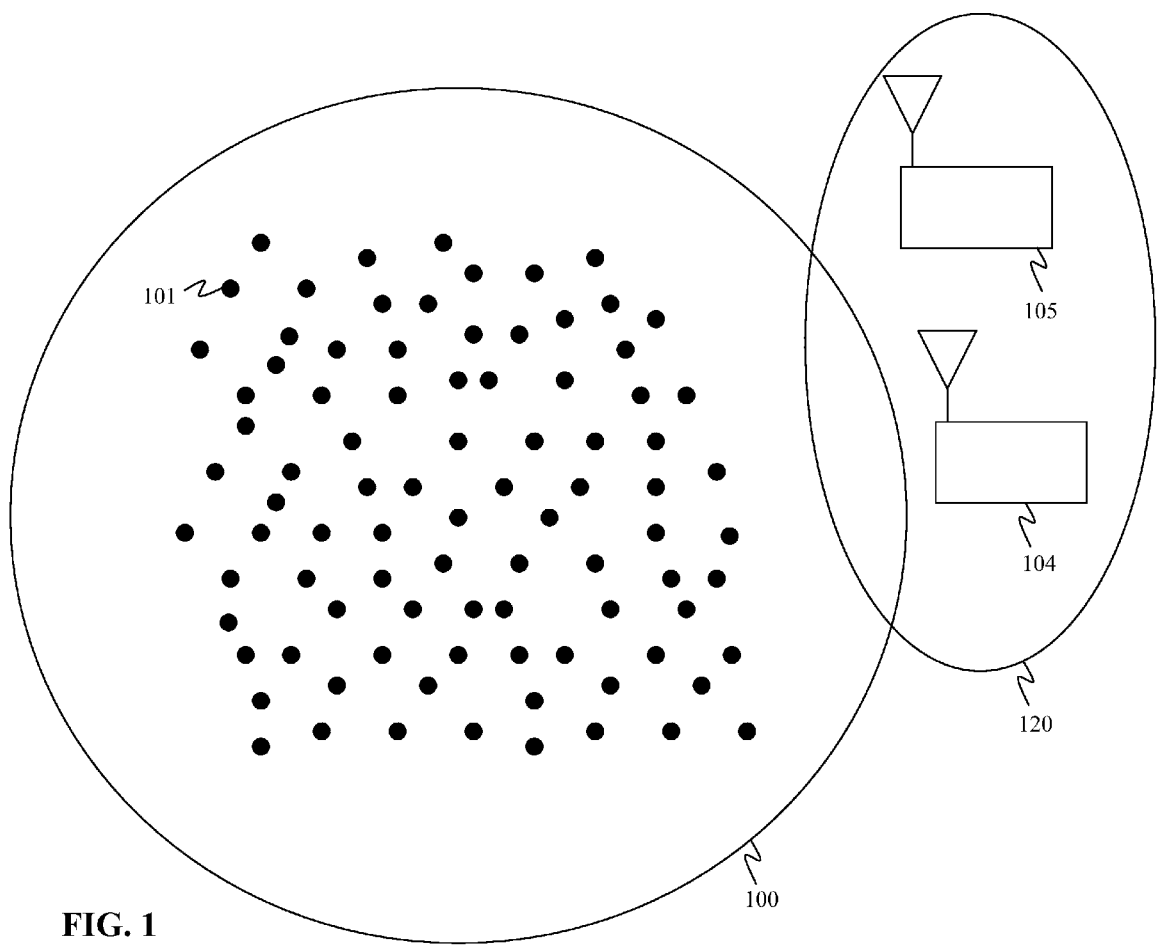
FIG. 1 is a block diagram showing a primary and secondary communication system.

Turning now to the drawings, wherein like numerals designate like components, FIG. 1 illustrates a primary and secondary communication system sharing the same spectrum. Secondary communication system preferably comprises an ad-hoc communication system utilizing the IEEE 802.22 communication system protocol that is modified to perform the functionality set forth below. However, in alternate embodiments of the present invention, communication system 100 may comprise any ad-hoc or non ad-hoc communication system, such as, but not limited to a neuRFon™ communication system, available from Motorola, Inc., a WLAN network typically utilizing IEEE 802.11b ad hoc networking protocols or Rooftop™ Wireless Routing mesh network manufactured by Nokia, Inc.

As shown, communication system 100 comprises plurality of nodes 101 (only one labeled). Nodes 101 form a communication network, that utilizes spectrum on a secondary basis. In other words, communication system 100 will utilize spectrum as long as it doesn't interfere with primary communication system 120. Primary communication system 120 is also shown in FIG. 1 operating in a same geographic area as secondary communication system 100. Primary communication system 120 comprises a plurality of transceivers 104-105 that are capable of over-the-air communication.

As discussed above, a problem exists in that sometimes a receiver in the secondary communication system may not know what frequencies/carriers are being utilized by a transmitter prior to that information being shared among devices. In order to address this issue, communication system 100 employs the use of spread-OFDM in the calling channel. In spread-OFDM, a single data bit is repeated across all, or a subset, of the carriers. Each carrier is subsequently modulated by a chip value from PN or spreading code. This improves robustness of the signal to lost carriers due to narrowband jamming or frequency selective fading.

When a transmitting device sends out a calling channel request, it first determines which carriers to use for data and which to leave blank to avoid interference with primary communication system 120. The calling channel request is then modulated onto a multi-carrier signal (including those carriers that will not be transmitted) using a spread-OFDM technique. Finally, the initiating device removes the blank carriers and transmits the resulting signal.

The spreading code may also provide multiple access features as in MC-CDMA. Various network or MAC functions may use different PN codes, and thereby allow advantages such as frame reception in the event of collision, or ability to discern different frame types. Multiple orthogonal codes can be used to increase data rate. Other codes could be used as well, such as algebraic FEC codes or simple repetition codes, as long as they provide enough redundancy to tolerate the missing carriers.

Since receiving devices will monitor all available channels for transmissions, the above-technique allows a cognitive radio transmitter to communicate with a receiver without the receiver first identifying clear spectrum to the transmitter. The processing gain of spread-OFDM allows a plurality of subcarriers to be lost without loss of transmitted data. The two devices may then negotiate radio parameters (modulation format, etc.) for data transmission.

Figure 2:
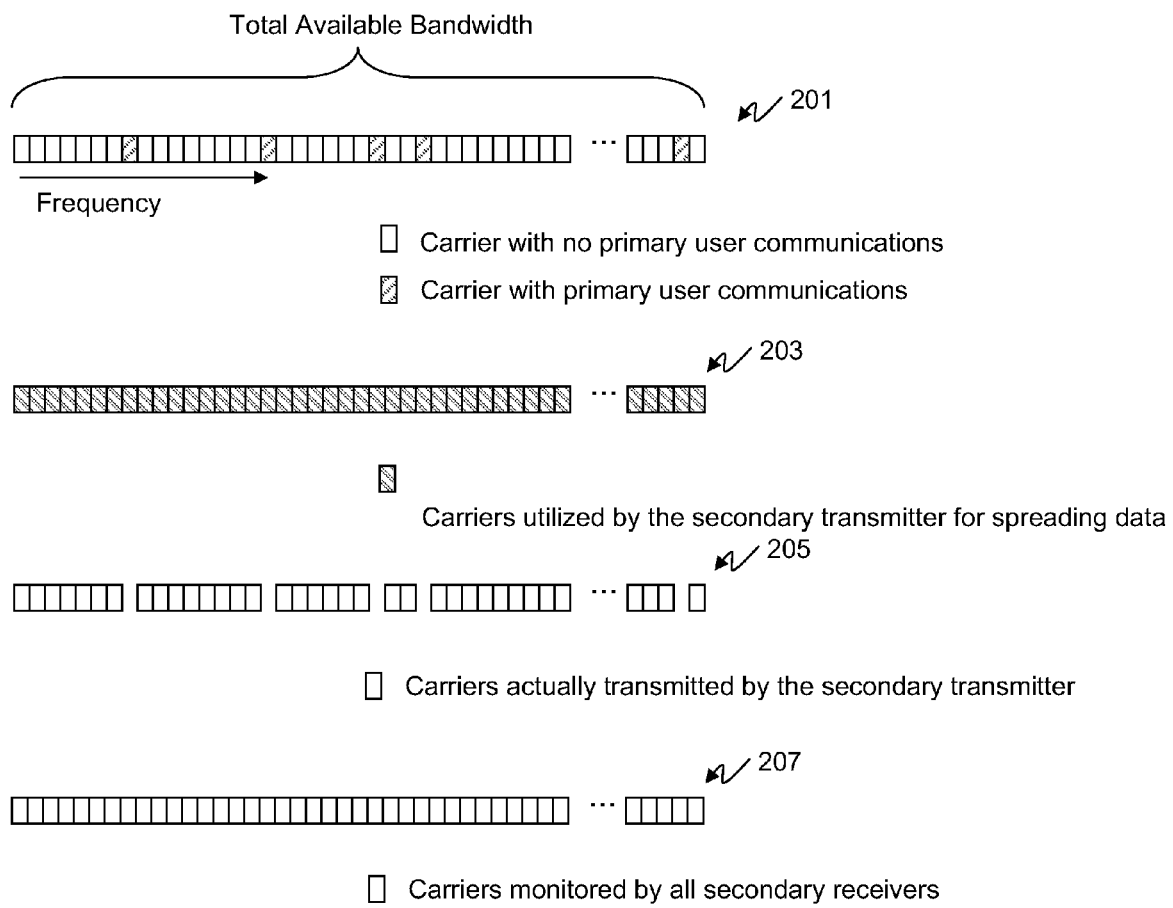
FIG. 2 illustrates data transmission.

FIG. 2 illustrates the above transmission technique. As shown in FIG. 2 multiple carriers/frequencies are available for communication for secondary communication system 100. However, not all frequencies are available for secondary communications. The carriers referenced via reference numeral 201 illustrate that some of the carriers are currently being used by primary communication system 120. Nonetheless, when a transmitter in communication system 100 wishes to transmit a channel request, the channel request will be spread among all available carriers, including the carriers that are currently being used by system 120. This is illustrated by reference numeral 203.

When transmission takes place, the transmitter will not transmit those carriers where primary communications are taking place. This is illustrated by reference numeral 205. Thus, even though all carriers have data spread over them, only a subset of the carriers will be transmitted. As illustrated (207), all secondary receivers will monitor the total available bandwidth for transmissions.

As discussed, because not all carriers will be transmitted by the secondary transmitter, secondary receivers will only receive a portion of the available data. However, because spread-OFDM is being utilized, the system is robust to lost carriers. Additionally, although reference numeral 205 illustrates no transmission on carriers having primary user communications, in alternate embodiments of the present invention there may be no transmission over several carriers around each "busy" channel. In other words, if a channel is in use by the primary communication system, the secondary communication system may choose to not transmit on that channel along with adjacent channels.

Figure 3:
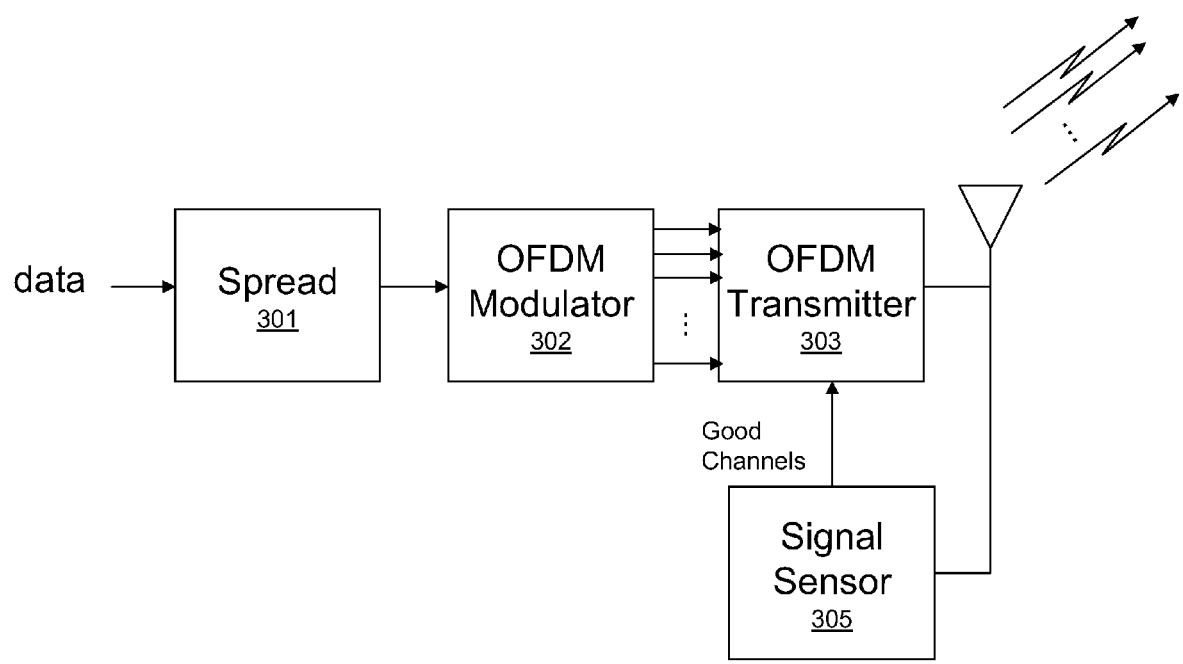
FIG. 3 is a block diagram of a secondary node of FIG. 1.

FIG. 3 is a block diagram of node 101. As shown, node 101 comprises spreader 301, and OFDM modulator 302, transmitter 303, and signal sensor 305. For simplicity, data from a single user (e.g., uplink) or for a single user (e.g., downlink) is shown in FIG. 3, however one of ordinary skill in the art will recognize that in typical OFDM transmitters, multiple users transmit (or are transmitted to) simultaneously with multiple symbols occupying the same time/frequency space. During operation a data stream enters spreader 301 where standard spreading occurs, producing a chip stream. For an example scenario where the data and spreading codes are binary, spreader 301 modulo 2 adds an orthogonal code (e.g., an N chip Walsh code) to data symbol. For example, in N chip spreading, data symbols are each replaced by an N chip spreading code or its inverse, depending on whether the data symbol was a 0 or 1. The spreading code preferably corresponds to a Walsh code from an 8 by 8 Hadamard matrix wherein a Walsh code is a single row or column of the matrix. Thus, for each data bit received, spreader 301 outputs a spreading code (Walsh code) modulated by the present input data symbol value. It should be noted that in alternate embodiments of the present invention additional spreading or other operations may occur by spreader 301. For example, power control and/or scrambling (with a real or complex scrambling code) may be done, as shown in the previous equation.

The resulting chip stream is output to OFDM modulator 302. As described above, OFDM modulator 302 modulates the chip stream onto the total available bandwidth (see FIG. 2), including those channels that are currently being utilized by the primary communication system. Each subcarrier is then output to transmitter 303.

As discussed above, all secondary communication systems are required to sense the channel to detect a licensed, primary user. Secondary devices are allowed to transmit if their transmissions will not interfere with any primary user. This is accomplished in node 101 by signal sensor 305 determining a signal strength of the primary users over the total available bandwidth. If signal sensor 305 determines that any primary user's transmission is above a predetermined threshold, the cognitive radio device assumes that its transmissions would cause interference to the primary user, and so inhibits transmission. A list of good and/or bad channels is passed to OFDM transmitter 303. Transmitter 303 will only transmit over the good channels. Thus, even though transmitter 303 received data spread over the total available bandwidth/channels, transmitter 303 will only transmit a subset of the received data.

Figure 4:
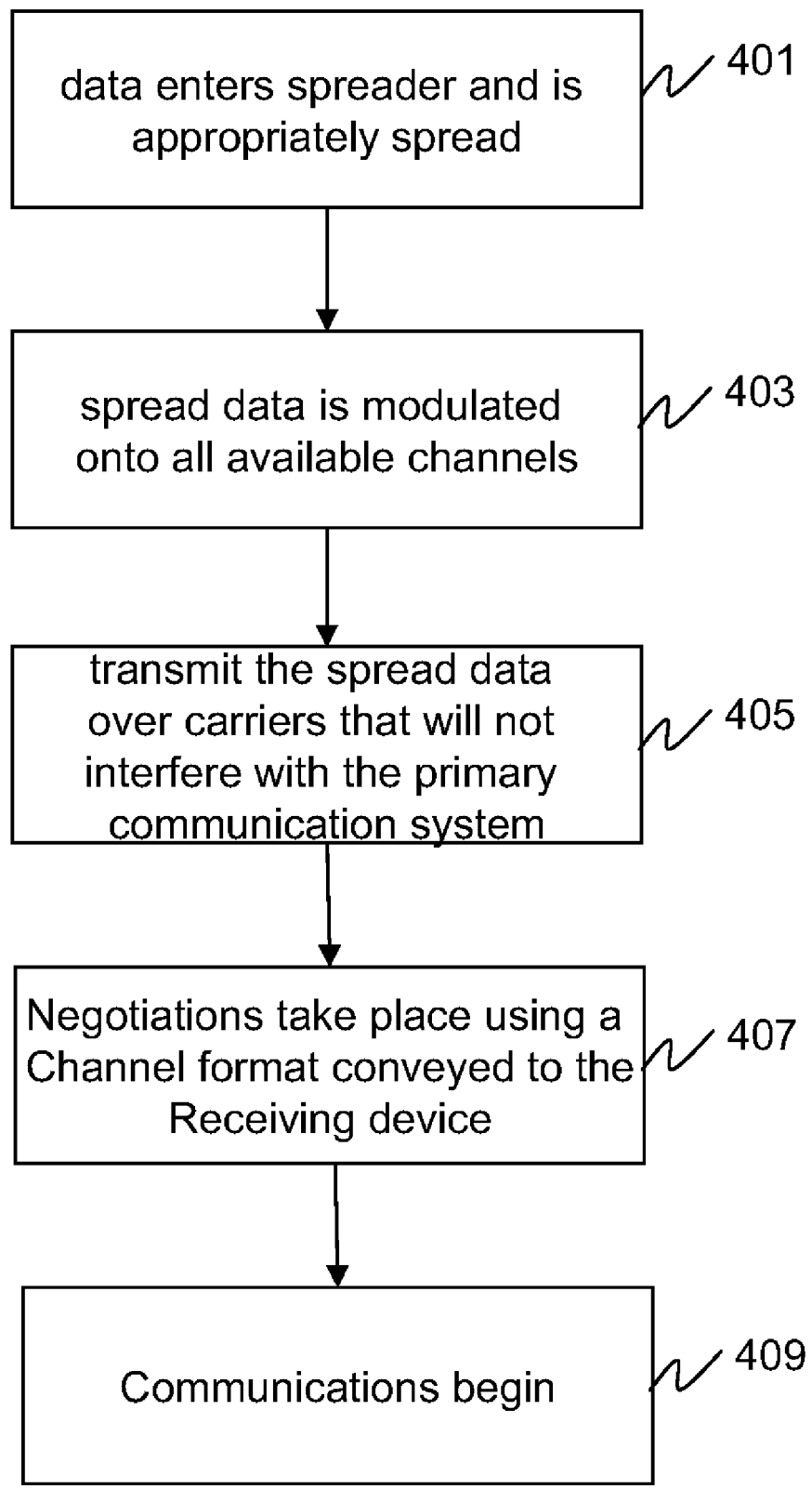
FIG. 4 is a flow chart showing operation of the node of FIG. 3.

FIG. 4 is a flow chart showing operation of the transmitter of FIG. 3. The logic flow begins at step 401 where data is received by spreader 301 and is appropriately spread. For this example, the data comprises information to be transmitted for initiating communications between two nodes in a secondary communication system (e.g., a calling channel request). The information includes a proposed channel format to use during the communications. However, one of ordinary skill in the art will recognize that other forms of data may be transmitted.

The spread data is modulated onto all available channels, including those channels that are currently being used by the primary communication system (step 403). Finally, at step 405 transmitter 303 transmits the spread data over carriers/channels that will not interfere with the primary communication system. An OFDM transmission technique is utilized by transmitter 303.

The step of transmitting entails signal sensor 305 determining channels that will not interfere with the primary communication system and instructing transmitter 303 to transmit on carriers not being utilized by the primary communication system (and possibly not transmitting on carriers adjacent to those being used by the primary communication system). Thus, the above-described transmitter modulates the data onto a plurality of available channels, yet transmits the spread data over a number of channels that is less than the plurality of available channels. Stated differently, the data is spread over a first number of channels and transmitted over a second number of channels. The second number of channels will not interfere with a primary communication system and are less in number than the first number of channels.

Because not all carriers will be transmitted by the secondary transmitter, secondary receivers will only receive a portion of the available data. However, because spread-OFDM is being utilized, the system is robust to lost carriers. Thus, the processing gain of spread-OFDM allows a plurality of subcarriers to be lost without loss of transmitted data. The two devices may then negotiate radio parameters (modulation, channels, format, etc.) for data transmission. The negotiation will take place using the channel format conveyed to the receiving device (step 407). In other words, the transmitting device may include control information in its signal that indicates which channels are clear based on its measurement, and the receiving device would respond on all, or a subset, of these channels depending on its own assessment of channel availability. The mutually available channels will be used for data transmission, and this channel set can be updated over time based on measurements from each device. Finally, at step 409 communications begin between the two secondary devices. The communications take place over channels that were negotiated in step 407.

While the invention has been particularly shown and described with reference to a particular embodiment, it will be understood by those skilled in the art that various changes in form and details may be made therein without departing from the spirit and scope of the invention. For example, is another embodiment of the present invention, the spread-OFDM method would only be used to modulate frame header information of a call request or any other frame type. The header would contain information on carrier formatting so that the receiver would use spread-OFDM to demodulate the header and non-spread-OFDM demodulation for the remainder of the frame. This would allow frame-by-frame adaptation of the carrier formatting. It is intended that such changes come within the scope of the following claims.

The invention claimed is:

1. A method for transmitting data by a secondary user of spectrum, the method comprising the steps of:
   receiving data to be transmitted by a wireless transmitter within a secondary communication system;
   spreading, the data with a spreader within the wireless transmitter;
   modulating all of the data onto a plurality of available channels with a modulator within the wireless transmitter;
   sensing channels from the plurality of available channels that are occupied by a primary user of the spectrum;
   transmitting by the wireless transmitter, only a portion of the spread data over a number of channels that are not being used by the primary user of the spectrum, and wherein the number of channels is less than the plurality of available channels, and wherein the wireless transmitter will not transmit the data that was modulated over the channels that are being used by the primary user of the spectrum; and
   wherein the wireless transmitter is allowed to transmit only if transmissions will not interfere with the primary user of the spectrum.

2. The method of claim 1 wherein the step of transmitting the spread data comprises the step of transmitting the spread data utilizing an OFDM transmission technique.

3. The method of claim 1 wherein the step of transmitting the spread data comprises the step of transmitting the spread data utilizing an OFDM transmission technique.

4. The method of claim 1 wherein the step of receiving the data comprises the step of receiving data for initiating communications between two nodes in a secondary communication system.

5. The method of claim 1 wherein the step of spreading the data comprises the step of modulo 2 adding an orthogonal code to each data symbol.

6. The method of claim 5 wherein the orthogonal code comprises a Walsh code.

7. A method comprising the steps of:
   receiving by a node within a secondary communication system, data for initiating communications between two nodes in the secondary communication system;
   spreading the data over a first number of channels with a spreader within the node;
   determining a second number of channels that will not interfere with a primary communication system, wherein the second number of channels is less than the first number of channels; and wherein the node is allowed to transmit only if transmissions will not interfere with the primary communication system;
   transmitting by the node, only a portion of the spread data over the second number of channels, wherein the node will not transmit the data that was spread over channels that will interfere with the primary communication system.

8. The method of claim 7 wherein the step of transmitting the spread data comprises the step of transmitting the spread data utilizing an OFDM transmission technique.

9. The method of claim 7 wherein the step of spreading the data comprises the step of modulo 2 adding an orthogonal code to each data symbol.

10. The method of claim 9 wherein the orthogonal code comprises a Walsh code.

11. An apparatus comprising:
   a spreader receiving data to be transmitted over a secondary communication system, and spreading the data over a plurality of available channels;
   a signal sensor determining channels that will not interfere with a primary communication system; and
   a transmitter transmitting a portion of the spread data over the channels that will not interfere with the primary communication system, wherein a number of channels that will not interfere with the primary communication system is less than the plurality of available channels, and wherein the transmitter will not transmit the spread data that was spread over channels that channels that will interfere with the primary communication system.

12. The apparatus of claim 11 wherein the transmitter comprises an OFDM transmitter.

13. The apparatus of claim 11 wherein the data comprises data for initiating communications between two nodes in a secondary communication system.

14. The apparatus of claim 11 wherein the spreader spreads the data by modulo 2 adding an orthogonal code to each data symbol.

15. The apparatus of claim 14 wherein the orthogonal code comprises a Walsh code.

* * * * *

UNITED STATES PATENT AND TRADEMARK OFFICE
CERTIFICATE OF CORRECTION

PATENT NO. : 7,706,465 B2  
APPLICATION NO. : 11/566893  
DATED : April 27, 2010  
INVENTOR(S) : Gorday et al.

Page 1 of 1

It is certified that error appears in the above-identified patent and that said Letters Patent is hereby corrected as shown below:

In Fig. 3, Sheet 3 of 4, delete " ![FIG. 3 101] " and insert -- FIG. 3 --, therefor.

IN THE SPECIFICATION

In Column 1, Line 32, delete "OFDM))" and insert -- (OFDM)) --, therefor.

Signed and Sealed this  
Fourteenth Day of August, 2012

David J. Kappos  
*Director of the United States Patent and Trademark Office*